Dec. 2, 1958   W. F. NEWHOUSE ET AL   2,862,207
STAPLING MACHINE
Filed March 5, 1956   9 Sheets-Sheet 3
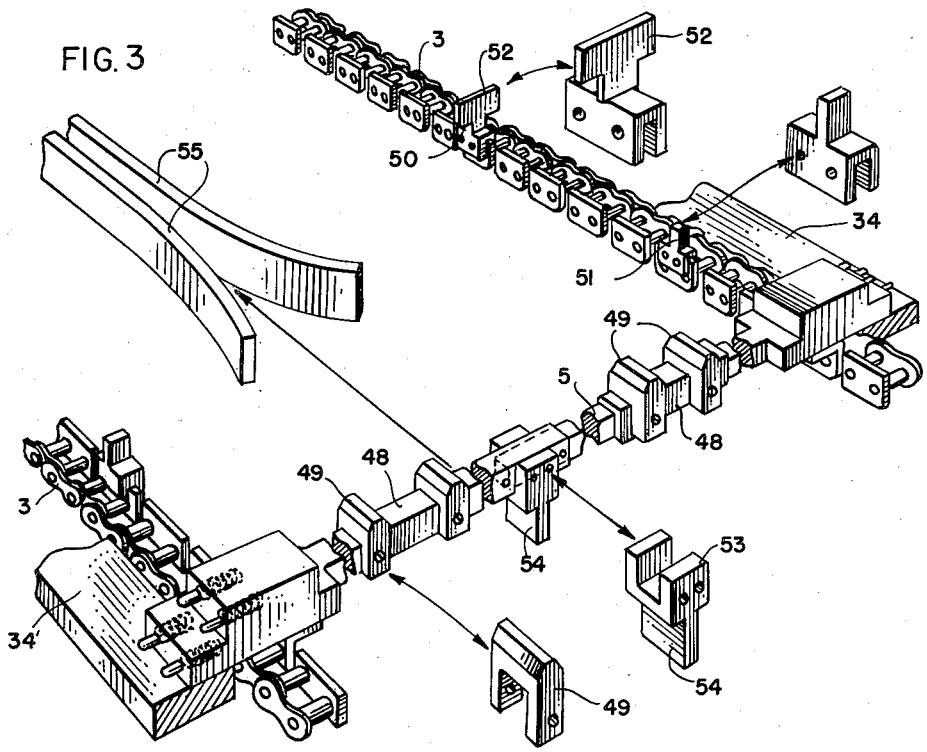
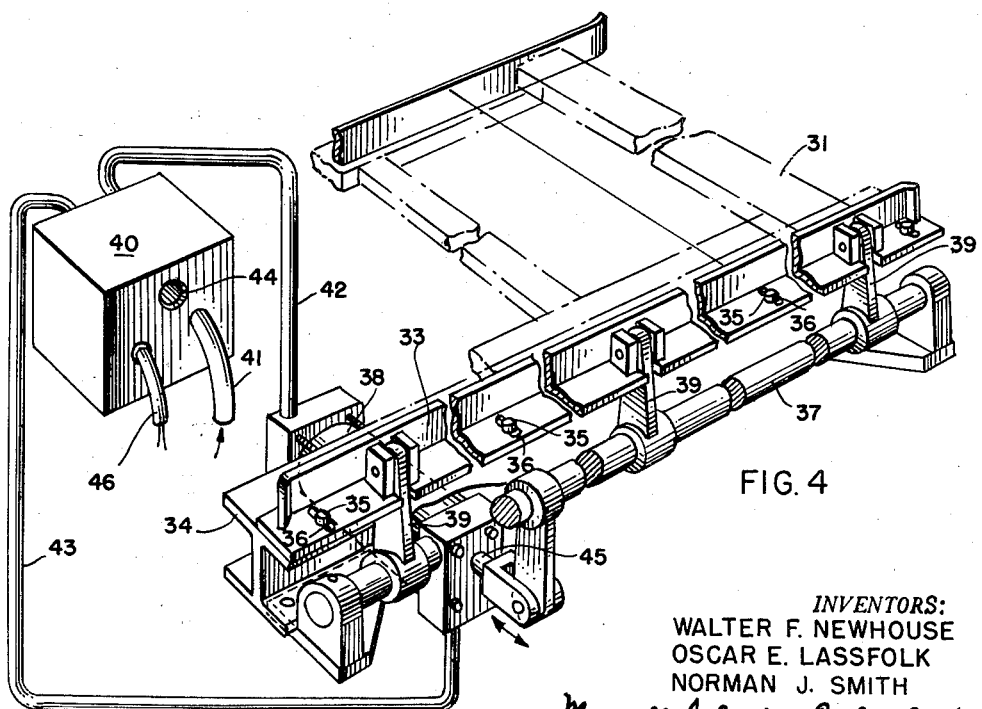
INVENTORS:
WALTER F. NEWHOUSE
OSCAR E. LASSFOLK
NORMAN J. SMITH
BY Marshall, Johnston, Cook & Root.
ATT'YS Dec. 2, 1958  W. F. NEWHOUSE ET AL  2,862,207
STAPLING MACHINE
Filed March 5, 1956  9 Sheets-Sheet 4
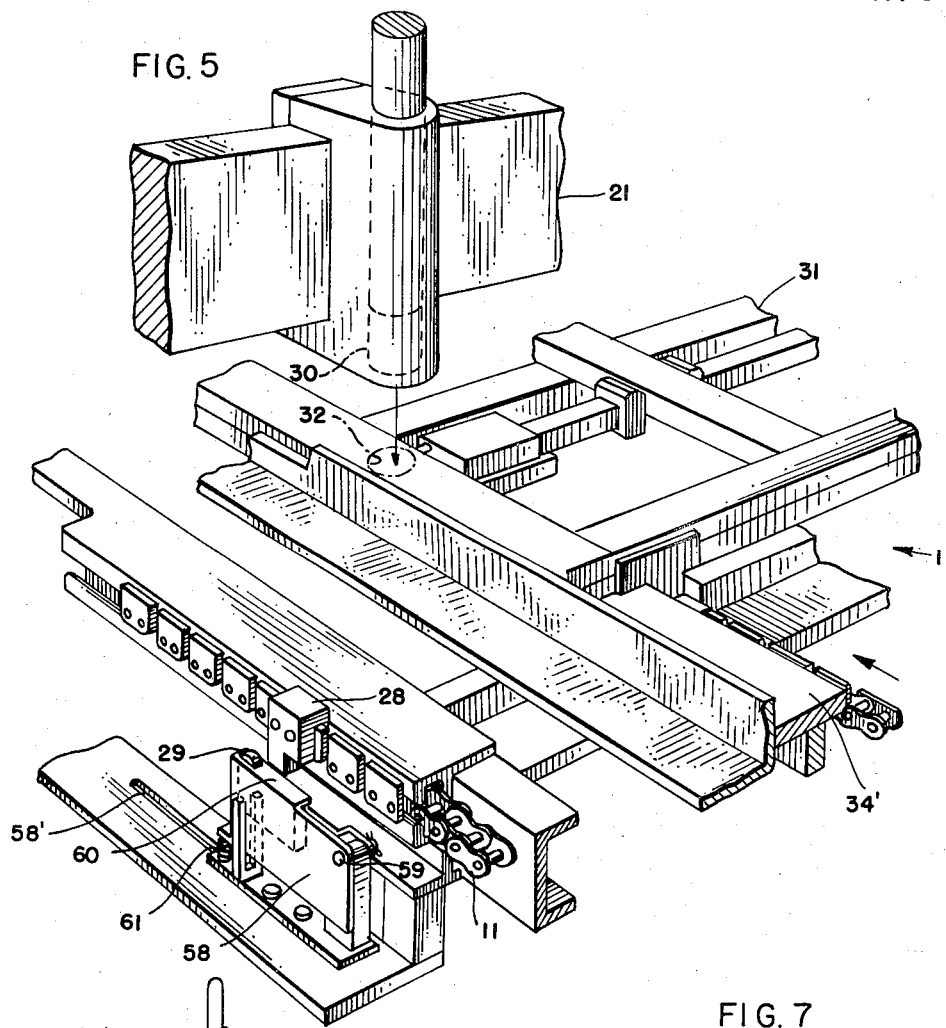
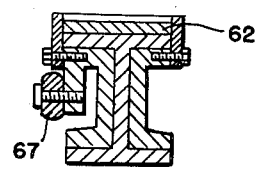
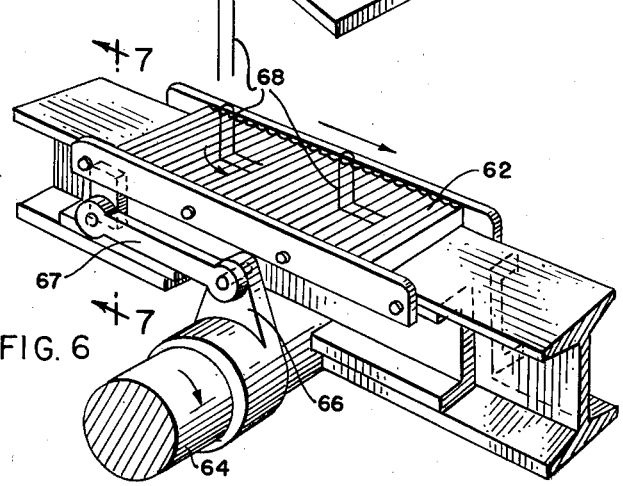
*INVENTORS:*
WALTER F. NEWHOUSE
OSCAR E. LASSFOLK
NORMAN J. SMITH
BY Margall, Johnston, Cook & Root.
ATT'YS Dec. 2, 1958  W. F. NEWHOUSE ET AL  2,862,207
STAPLING MACHINE
Filed March 5, 1956  9 Sheets-Sheet 5

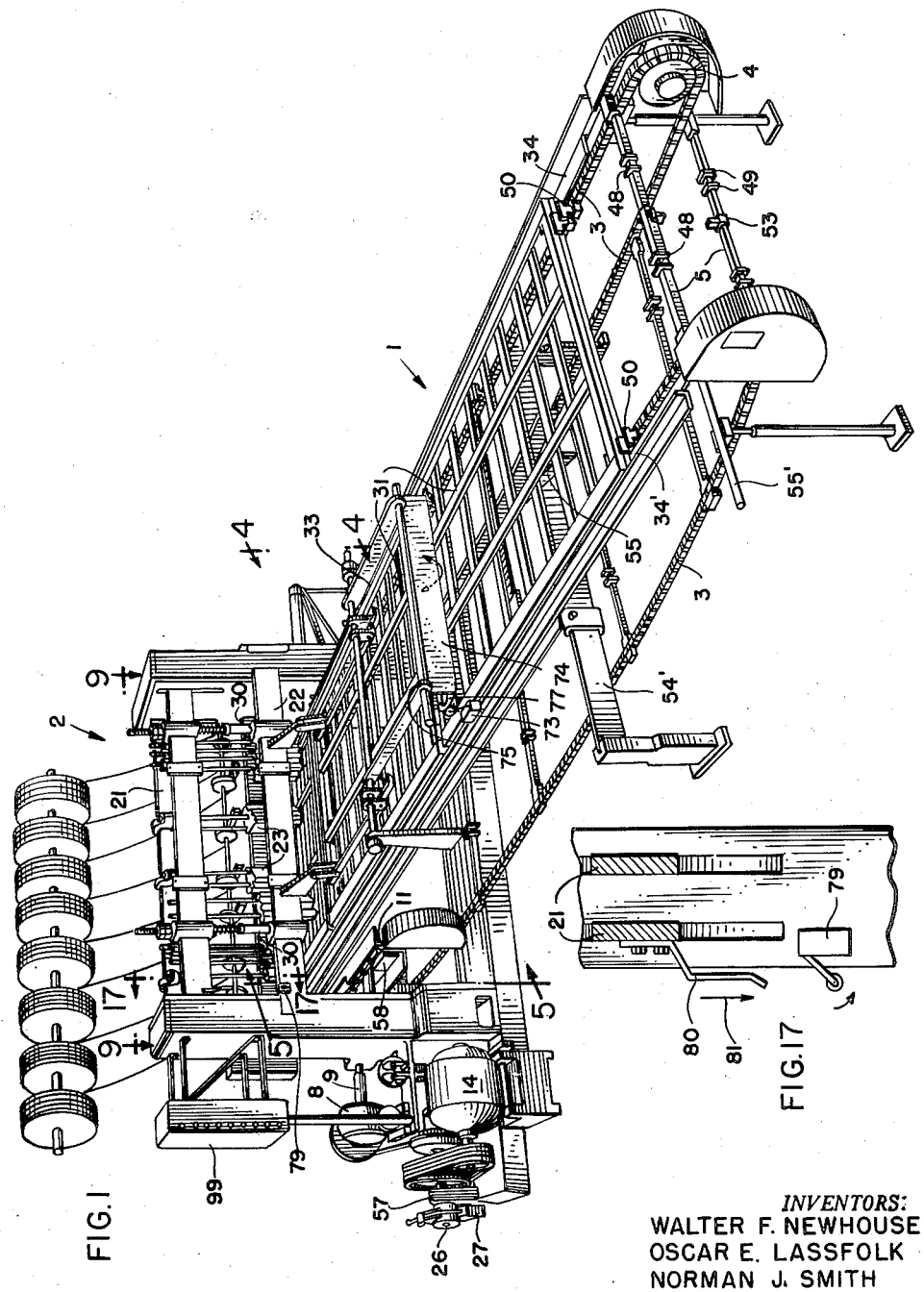

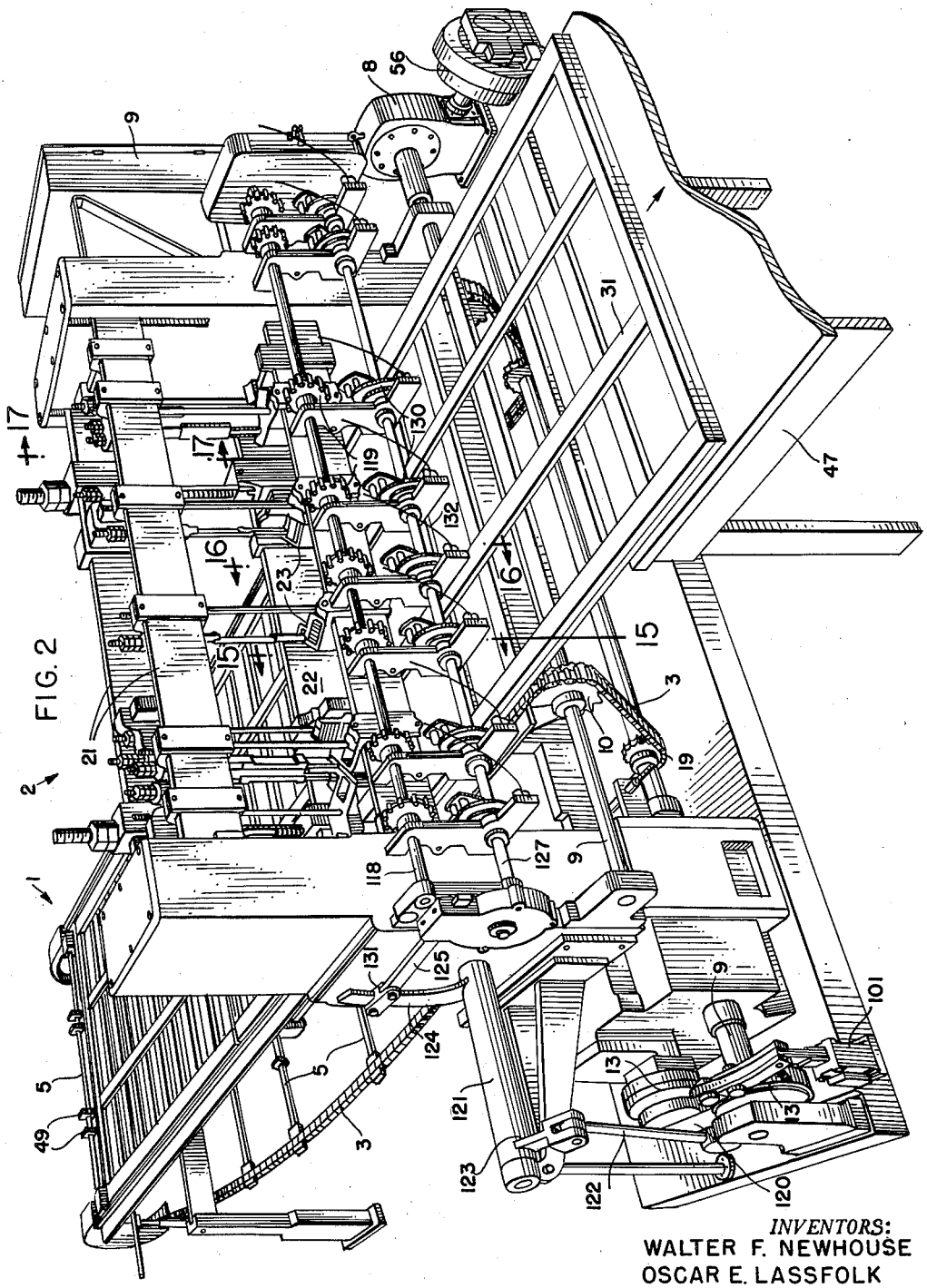

INVENTORS:
WALTER F. NEWHOUSE
OSCAR E. LASSFOLK
NORMAN J. SMITH
BY Margall, Johnston, Cook & Root
ATT'YS Dec. 2, 1958     W. F. NEWHOUSE ET AL     2,862,207
STAPLING MACHINE
Filed March 5, 1956                         9 Sheets-Sheet 7

INVENTORS:
WALTER F. NEWHOUSE
OSCAR E. LASSFOLK
NORMAN J. SMITH

BY *Marshall, Johnston, Cook & Root*
ATT'YS

Dec. 2, 1958 W. F. NEWHOUSE ET AL 2,862,207
STAPLING MACHINE
Filed March 5, 1956 9 Sheets-Sheet 9

INVENTORS:
WALTER F. NEWHOUSE
OSCAR E. LASSFOLK
NORMAN J. SMITH
BY Margall, Johnston, Cook & Root.
ATT'YS

United States Patent Office 2,862,207
Patented Dec. 2, 1958

2,862,207

STAPLING MACHINE

Walter F. Newhouse, Oscar E. Lassfolk, and Norman J. Smith, Benton Harbor, Mich., assignors to Saranac Machine Company, Benton Harbor, Mich., a corporation of Michigan Application March 5, 1956, Serial No. 569,612

13 Claims. (Cl. 1—147)

This invention relates to machinery for assembling and fastening rail and stile members together to form rectangular frames or pallets; it also relates to making box and crate sections made of cleats, slats and sheet materials consisting of ends, sides, tops, bottom, fronts and backs for shipping containers, or the like. The rails, stiles, cleats, slats and sheets are generally made from forest products such as lumber, wood, veneer, plywood, corrugated and solid fibreboard, Celotex or combinations, thereof, or the like.

Certain industries have the need for frames or pallets comprising a number of stiles and rails or cleats, slats and sheet materials fastened together. Such frames may be useful to form boxes, crates, partitions, walkways, and the like. In the manufacture of spring cushions and mattresses, such a frame is used to form the base for a box spring.

A copending patent application of Walter F. Newhouse, Serial No. 569,384, March 5, 1956, discloses a stapling head suitable for use with the machine of this invention. The stapling head may be mounted in a fixed position over a frame or other workpiece carried by a conveyer. When an upper bar assembly descends, a pair of plungers operate to swedge or cut a length of wire, and to bend the wire forming a staple and thence to drive the staple into the workpiece.

It is an object of this invention to provide a method and means for assembling pre-cut pieces of lumber, or like material, into a predetermined pattern forming a frame or pallet, and for holding the assembled pieces in the pattern such that they may be mechanically stapled together into a unitary frame.

Another object of this invention is to provide a method for moving a frame or other workpiece along a conveyer and stopping the conveyer at intervals according to a pattern chain when the frame is positioned for operation of transversely spaced fastening devices such as the stapling heads. Each stapling head may thence be operated to drive staples according to a wire feed pattern wheel. The combination of the pattern chain and the wire feed pattern wheels permits staples to be driven at predetermined longitudinal and transverse positions on the frame in accordance with pre-set patterns and configurations.

A further object is to provide a stapling machine with a conveyer upon which pre-cut rails and stiles may be laid in a predetermined configuration—the said conveyer being adapted to move the stiles and rails, cleats and slats intermittently and to present them in a predetermined spaced relation with a stapling device which may drive staples therethrough as the conveyer rests between intermittent motions.

Another object is to provide an intermittently moving conveyer having a pair of parallel movable chains and having a plurality of cross members connected between the chains, the cross members may be provided with adjustable or detachable guides or pocket parts adapted to hold stiles in any of various spacings which may be preset by arranging the guides along the cross members, said chains may have further parts adapted to hold the rails in any pre-set spacing arrangement which may be determined by the positioning of the pocket holders on the chain.

A further object is to provide a stapling machine with a skip feed mechanism wherein a staple head or driver descends upon a frame carried by an intermittently moving conveyer, the head descending upon the frame during intervals when the conveyer is at rest, the skip feed mechanism is responsive to a pre-set patterning means such that a stapling operation may be completed only when the stapling head descends and when the patterning mechanism permits a staple to be fed thereby.

A further object is to provide a pattern chain for a stapling machine, said pattern chain moving at a rate corresponding to the rate of movement of the conveyer holding the frame to be stapled, the pattern chain being operatively associated with means for stopping the conveyer at predetermined points to permit a stapling head to descend thereupon and to drive a staple therethrough.

Another object is to provide a system for controlling the conveyer of the stapling machine, such that the workpiece to be stapled moves intermittently and rests at intervals when parts to be stapled lay beneath the stapling heads as may be dictated by a pre-set pattern chain moving synchronously with the conveyer; and for controlling the stapling heads of the machine such that a staple will be driven by a particular stapling head only during those rest intervals of the conveyer when a preset wire feed pattern wheel, moving in timed sequence with the pattern chain, dictates that staple must be driven by such head during such conveyer rest interval.

A further object is to provide an electrical switch for cooperation with dogs moving on a pattern chain to achieve a precise timing in stopping the conveyer for a stapling operation; to eliminate possible inaccurate timing which might result from sagging of the chain and consequent vertical displacement of a dog. The switch may be mounted on a pivotal cam assembly pivoting it downwardly an amount corresponding to the vertical displacement and thus supporting the switch in a position to be engaged by the leading edge of the dog regardless of the vertical displacement thereof.

A more complete understanding of the present invention, its mode of operation and its advantages may be gathered from further reading of this specification, together with an inspection of the accompanying drawings in which:

Fig. 1 is a perspective view looking from the front of the stapling machine of this invention;

Fig. 2 is a perspective view looking from the rear of the stapling machine and looking in the direction opposite to that of Fig. 1;

Fig. 3 is an enlarged perspective view of a part of the conveyer assembly shown in Fig. 1, but with much of the structure removed to illustrate particularly the chains and cross members with detachable fittings for holding the rails and stiles in an arrangement that may be pre-set on the machine;

Fig. 4 is a fragmentary perspective view looking along the plane 4—4 in Fig. 1 and showing the clamping mechanism associated with the conveyer for clamping and tightly holding the frame during the rest intervals between the intermittent movements of the conveyer, together with a schematic representation of a solenoid valve and pneumatic or hydraulic circuit for operating the clamping mechanism;

Fig. 5 is an enlarged fragmentary perspective view along the plane 5—5 of Fig. 1 and showing a part of the conveyer together with a part of the pattern chain and an electric switch engageable with dogs on the pattern chain and operable to stop the conveyer in a predetermined position for a stapling operation;

Fig. 6 is a fragmentary perspective view of a staple clinching device positioned beneath the conveyer and operable to bend and clinch the staples as they are driven through the frame;

Fig. 7 is a vertical section looking along the plane 7—7 of Fig. 6 and illustrating the structure of the staple clinching device;

Figure 16:
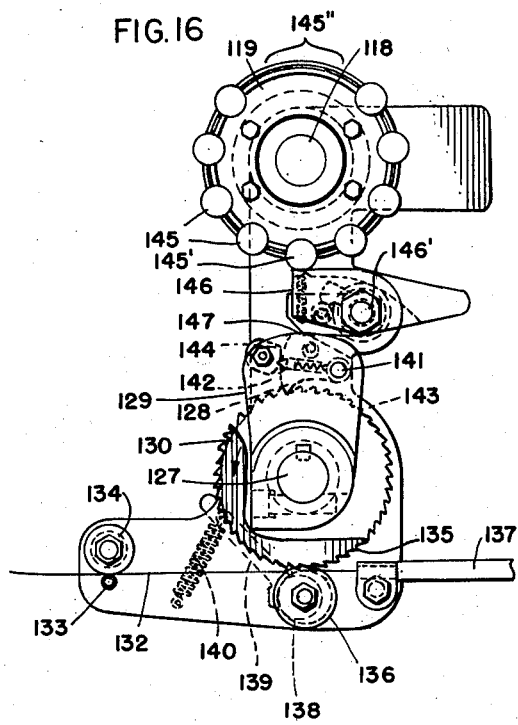

Fig. 16 is a vertical section along the plane 16—16 of Fig. 2 illustrating the mechanism for controlling the wire feed and therefore for determining the stapling or non-stapling of the head; and Fig. 17 is a vertical section along the line 17—17 of Figs. 1 and 2 and particularly illustrating the arrangement of an electrical switch and cam part controllably associated with the switch for de-energizing the electrical circuit controlling the chain motor and for thereby preventing movement of the conveyer chain when the stapling heads are in their lowered position.

The stapling machine of this invention comprises generally a conveyer 1 and a stapling assembly 2, as is shown in Figs. 1 and 2. The conveyer 1 comprises a pair of chains 3 movable over sprocket wheels 4 and connected by a plurality of cross members 5. The conveyer chains 3 may be driven by a motor 6 or may be held by a magnetic brake 7 (see Fig. 8) which are coupled through a gear box 8 to a drive shaft 9. The drive shaft 9 is drivingly coupled to the conveyer chains 3 by a pair of sprockets 10 and is drivingly coupled to a pattern chain 11 by a sprocket 12.

Figure 8:
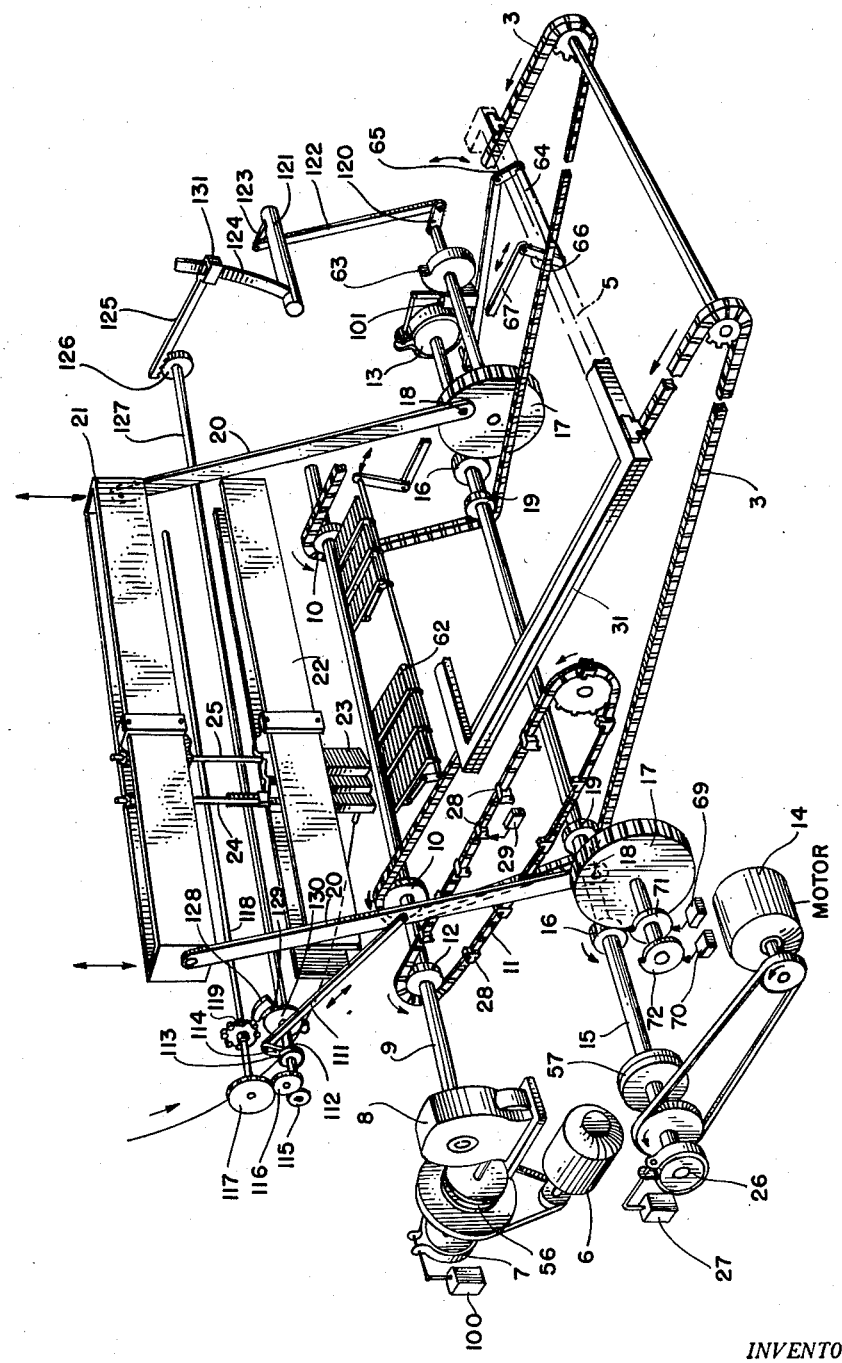
Fig. 8 is a schematic diagram illustrating the manner of operation of the various moving parts of the stapling machine of this invention.

A second motor 14 is drivingly connected to a shaft 15 which, in turn, drives a pair of pinion gears 16 meshing with a second pair of gears 17 having crank pins 18 thereon. The gears 17 are fixed to stub shafts as shown in Fig. 8. As is shown in Fig. 8, the conveyer chains are guided around a pair of sprockets 19 mounted on the shaft 15. Since the sprockets 19 are rotatable on the shaft 15 and not fixed thereto, the motor 14 and shaft 15 do not drive the conveyer 1.

A pair of crank arms 20 coupled to the crank pins 18 reciprocate the upper bar assembly 21 upwardly and downwardly. A lower bar assembly 22 is fixed in a stationary position and supports the stapling heads 23, one of which is shown in Fig. 8. A pair of operating plungers 24 and 25 are associated with each stapling head 23 and are operatively connected to the upper reciprocating bar assembly 21. Thus, as the upper bar assembly reciprocates downwardly, the former and driver of the stapling head 23 is likewise driven downwardly and a staple may or may not be driven therefrom, depending upon the action of the wire feed mechanism to be described later. Brakes 26 and 13 operated by solenoids 27 and 101, Fig. 8, are mounted to exert a braking force on the shaft 15 to hold the upper bar assembly 21 stationary between the stapling operations of this machine.

The conveyer 1, including the two side chains 3 and the cross members 5, is adapted to receive pre-cut pieces of lumber which are placed thereon by loading attendants who may be stationed on either side of the conveyer and may have convenient access to bins of stock or lumber pre-cut to lay suitably on the conveyer. The conveyer holds and moves the assembled frame past the stapling point beneath the stapling assembly 2, Fig. 1. The chain motor 6 drives both the conveyer 1 and the pattern chain 11 which thereby moves synchronously with the conveyer, Fig. 8. The pattern chain 11 carries a plurality of stop members 28 which are detachably mounted upon the chain 11 and are completely adjustable therealong to permit the setting up of any desired pattern arrangement. A microswitch 29 is positioned in spaced relation beneath the pattern chain to be engaged by the stop members 28, Fig. 5. The stop members 28 will each engage and operate the microswitch 29 as they are carried by the pattern chain 11, and the microswitch is electrically connected, as will be described later, to stop the conveyer chain and to thereby halt the conveyer and commence a stapling operation. The positioning of the stop members 28 on the pattern chain 11 thereby determines the points at which the conveyer 1 will stop for a stapling operation, and thus is determined the longitudinal positions of the driven staples on the assembled frame.

The conveyer 1 thereby moves intermittently past the stapling position 2 and rests at points determined by the stop members 28 on the pattern chain 11 to receive staples in the frame. During the stapling operation, the head motor 14 rotates the crank gears 17, Fig. 8, through one complete revolution, thereby causing the upper bar assembly and the stapling formers and drivers to descend upon the frame for the stapling operation and thence to return to their normal raised position, at which time the conveyer 1 again moves forwardly.

During the stapling operation, the frame to be stapled is tightened and held rigidly from the top face and from the sides thereof. In Fig. 5, the upper bar 21, in descending, carries a spring clamp member 30 which descends upon the frame 31 at a point outlined at 32. As may be seen in Fig. 1, the upper bar assembly 21 carries a pair of spring clamps 30, each of which descends upon and holds the frame 31 at opposite sides thereof during the stapling operation.

The side clamping arrangement is best illustrated in Fig. 4, wherein it may be seen that the side clamping rail 33 is slidably mounted on a supporting rail 34 and held thereon by studs 35 extending upwardly through slotted holes 36. A shaft 37 is pivoted by a compressed air cylinder 38 and moves the side clamping rail 33 inwardly against the frame 31 by force exerted through a plurality of upstanding arms 39 pivotally attached to the side clamping rail 33. A solenoid valve 40 provides compressed air to the cylinder 38 and is electrically operated by a control circuit, to be described later.

As is shown in Fig. 4, the solenoid valve receives air under pressure through a supply hose 41 and passes the compressed air selectively to either end of the cylinder 38 through the connecting ducts 42 and 43. The valve 40 operates as a reverse mechanism such that one end of the cylinder 38 receives the pressure of the air from the supply hose 41, and the other end of the cylinder 38 is connected to an exhaust port 44. The piston rod 45 is therefore urged either to the right, Fig. 4, to provide clamping action of the rail 33, or is urged to the left to release the rail 33 from the frame 31, depending upon which of the two air ducts 42 or 43, is coupled to the pressure hose 41 and which is coupled to the exhaust port 44. The operation of the solenoid valve 40 is accomplished electrically by a connection 46 to the electrical control circuit.

As may be seen in Fig. 2, the stapled frame 31 is expelled from the rear of the stapling machine and may be received on a table 47 or any other suitable surface.

Conveyer arrangement

Fig. 3 illustrates a portion of the conveyer 1 showing the two side chains 3 and a single cross member 5. The conveyer is adapted to receive a plurality of stiles or longitudinal frame members. The stiles at the edges of the frame may rest upon the fixed side rail 34 and an adjustable side rail 34', certain intermediate stiles being laid longitudinally on the conveyer in pockets 48 between detachable members 49. The cross members or rails of the frame may be laid across the conveyer 1 spanning the distance between the two chains 3 with their ends resting upon the stationary side members or rails 34 of the conveyer. Each chain 3 is equipped with detachable pusher members 50 and 51 which engage and move the stiles. The pusher member 50 has an upwardly extending T-shaped part 52, a portion of which overhangs a stationary rail 34 and may engage and move the side rails of the frame 31.

Since it is desirable that the stapling machine of this invention be adaptable to handle many different frames having various arrangements of stiles and rails, the detachable members 49 for holding the stiles therein may be attached in any pattern or spacing along the cross members 5. It is further desirable that the center of the cross members 5 have accurate positioning under the stapling heads and that no shifting transverse to the conveyer be permitted. Therefore, the cross member 5 carries a detachable member 53 which has a U-shaped part adapted for attachment to the cross member 5, and it has a downwardly extending projection 54. A stationary centering guide comprising a pair of stationary rails 55 is positioned below the conveyer, such that the downwardly extending projection 54 will be guided into the slot therebetween. The rails 55 have an outward curvature to receive the downwardly extending projection 54 of the centering member 53, and thence to guide the member 53 such that the cross bar 5 is properly positioned transversely on the conveyer.

The conveyer 1 comprises generally a pair of chains 3 which carry cross members 5 having adjustable attachments thereon. It is desirable that the conveyer accommodate various styles of frames to be stapled and therefore the attachments on the cross members 5 may be moved and similar attachments on the chain 3 may be positioned accordingly. If the frame is narrower than the maximum which the conveyer 1 may accommodate, the lefthand rails 34' may be slidably moved along various supporting members 54', Fig. 1. Likewise, the left-hand chain 3 may be moved to the right to narrow the conveyer, since the supporting sprockets 4 are not fixed to a common shaft but are independently supported and may be slidably moved and attached to an independent cross support 55'. As is illustrated in Fig. 1, the conveyer 1 is reduced in size or narrowed to a degree less than its maximum to accommodate narrower frames or pallets, as shown.

Timing for conveyer rest intervals

Each stapling operation is initiated as a dog 28 engages the microswitch 29, and thereupon the conveyer chain is stopped by operation of a magnetic clutch 56, Fig. 8, and the solenoid operated brake 7 which disengages the power of the chain motor 6 from the conveyer and applies the braking power to the conveyer. The stapling cycle then initiates with the operation of a second magnetic clutch 57 and the release of the solenoid brakes 27 and 13 causing the operation of the upper bar assembly 21.

The timing for the stapling operation must be accurate in order that the conveyer 1 be stopped with precision beneath the stapling heads 2. It has been found that the pattern chain 11 and the dogs 28 thereon are subject to some amount of sag or vertical displacement due to a number of operating conditions with a conveyer of this type, and it is essential that the operation of the microswitch 29 be precisely timed from the leading edge of the dog 28 and not be influenced by a vertical displacement of the pattern chain 11, which may cause the dog 28 to strike the microswitch from various positions. Fig. 5 illustrates a manner of mounting the microswitch 29 on a structure 58 which is pivoted at a point 59. The structure 58 includes a substantially horizontal cam surface 60 which is urged upwardly by a spring 61. As the dog 28 moves forwardly on the pattern chain 11, it first contacts the cam surface 60 and pivots the structure 58 downwardly, in accordance with the vertical positioning of the dog 28. The structure 58 thus supports the microswitch 29 in a precise vertical position relative to the moving dog 28. The microswitch 29, being held with the same vertical positioning relative to the dogs, will be engaged at the same point by the leading edge of each dog 28, regardless of the vertical displacement thereof, and therefore the timing produced by the operation of the microswitch is accurate.

In stapling flat frames comprising pre-cut pieces of lumber, it has been found most satisfactory that the staple be of a length such that it will protrude and may be clinched when fully driven. In the operating diagram, Fig. 8, the stapling heads 23 are positioned over clinching plates 62 which provide a firm base upon which the frame may rest as it is being stapled. A cam 63, fixed to the stub shafts which carry the gears 17, operates a linkage system including a shaft 64 with cranks 65 and 66 thereon and a push-pull link 67, such that the clinching plates 62 are given a sudden impetus. The function and operation of the clinching plate 62 may be seen in Figs. 6 and 15, wherein the staple 68 is driven through the frame 31 and is clinched by the rapid rearward motion of the clinching plate 62 as the points of the staple emerge through the frame 31.

Location and function of electrical controls

Figure 14:
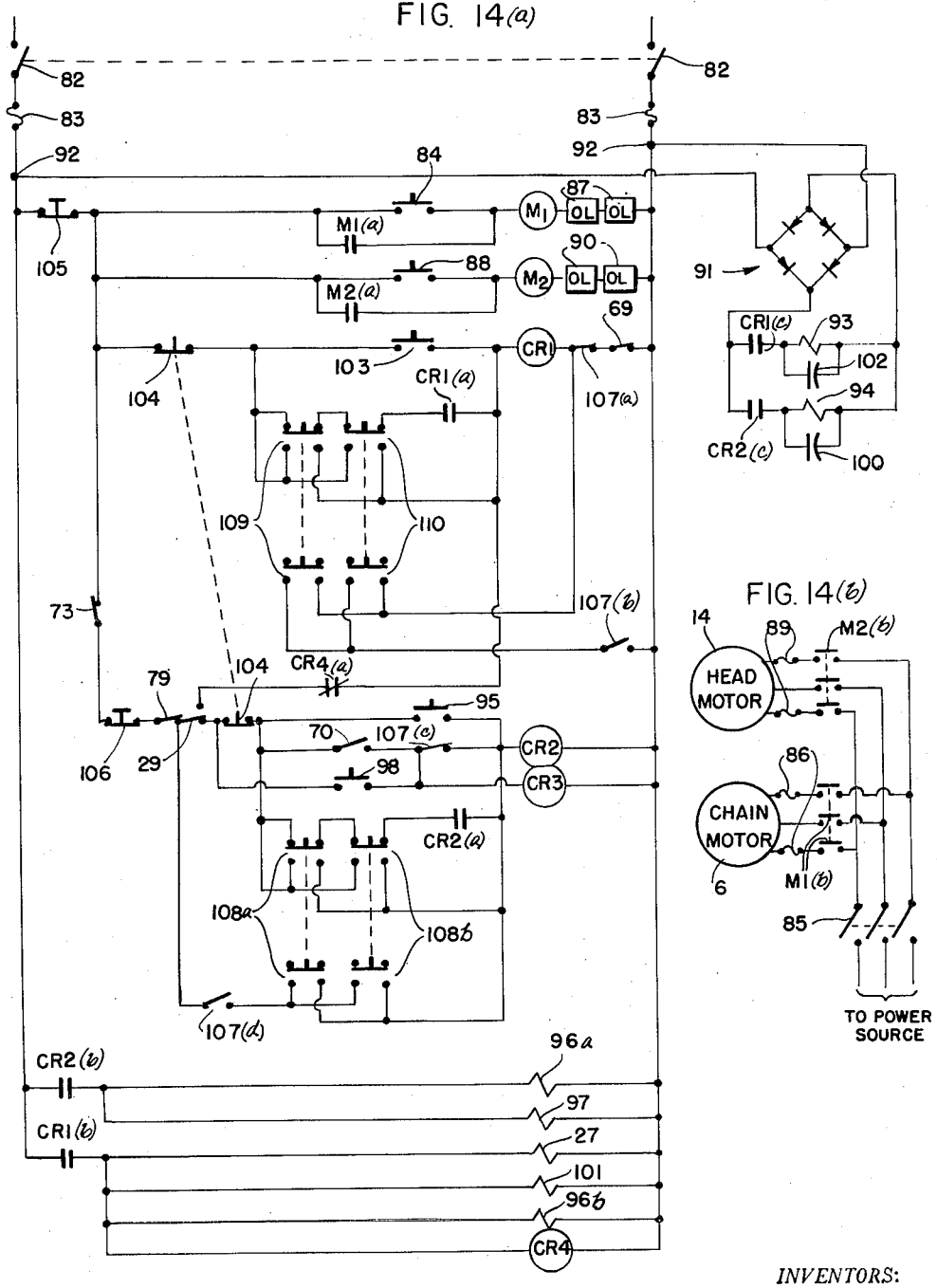
Fig. 14(a) is a schematic diagram of the electrical circuit for controlling the motors, brakes and clutches of the stapling machine of this invention.
Fig. 14(b) is a schematic diagram of the electrical circuit supplying power to the motors.

As heretofore stated, the operation of the stapling cycle is initiated by a microswitch 29 when contacted by a dog 28. The upper bar assembly is then moved downwardly and returns to the upper position by a single revolution of the crank gear 17, Fig. 8. A pair of limit switches 69 and 70 operated by cams 71 and 72, which rotate on the same shaft as the crank gear 17, operate to terminate the stapling cycle by stopping the upper bar structure and by restarting the conveyer chain. The manner in which the limit switches 69 and 70 are electrically connected, and their function, will be further discussed in connection with the wiring diagram, Fig. 14.

Fig. 1 illustrates the positioning of a safety switch 73 which functions to stop the conveyer if the rails and stiles forming the frame are misplaced or misaligned upon the conveyer such that they would cause a jam. A shield member or apron 74 is pivotally mounted at 75, the shield member 74 carrying a straight line cam 77 which is fastened to the apron 74 as indicated in Fig. 1. In normal operation, the pivotal shield or apron 74 rests in a vertical position as illustrated in Fig. 1. However, if the pre-cut rails and stiles of the frame are not properly laid into the conveyer, or are warped such that they would jam, they contact the apron 74 which, in turn, moves with the jam or warped stiles causing the cam 77 to move in the direction of the safety switch 73, thus causing the operation of the safety microswitch 73 which functions to stop the machine.

During the intervals of stapling operations, the upper bar structure descends with the stapling head and parts engage the frames carried by the conveyer 1. It is important during this operation that the conveyer 1 be held stationary, since any movement thereof would cause damage both to the stapling heads and to the conveyer itself. To assure that the conveyer 1 is immobilized during the stapling operation, a limit switch 79, Fig. 17, is positioned on a stationary frame member supporting the upper bar assembly and adapted to be operated when the bar assembly is lowered. A cam bracket 80 is attached to the upper bar assembly 21 and moves therewith. In Fig. 17, the upper bar assembly 21 is shown in its raised position but the arrow 81 indicates the downward motion thereof, whereupon the microswitch 79 will be engaged by the cam bracket 80. During the interval while the bars 21 are lowered and the microswitch 79 is thereby operated, the part of the electrical circuit controlling the conveyer 1 is thus de-energized and the conveyer 1 is rendered immovable.

*Electrical control circuit*

Figs. 14(a) and 14(b) are schematic diagrams of the control circuit, and the starting and operation of the machine will be described with reference thereto. To start the machine, the main switch 82 is closed and a voltage is conveyed to the control circuits through a pair of fuses 83. A motor start push button 84 may be depressed for starting the chain motor 6. The push button 84 energizes a circuit through the motor start coil M1 which closes a pair of contacts M1(a), thereby maintaining its own circuit after the push button 84 has been initially depressed. Further contacts M1(b) are closed starting the chain motor 6, Fig. 14(b). The chain motor draws power through a line switch 85, and through an overload safety device 86, which may be fuses or overload coils, to operate either or both of two pairs of contacts 87. Overloading the motor will cause coil 86 to de-energize the motor start coil M1 and thereby stop the motor by opening the switch M1(b).

The circuit for starting the head motor 14, Figs. 14(a) and 14(b), is similar to that for starting the chain motor 6 in that a push button 88 may be depressed, energizing a circuit through the motor operating relay M2, which likewise may retain itself by a pair of contacts M2(a). The relay M2 supplies power to the head motor 14 by closing contacts M2(b). The head motor is likewise protected with an overload device 89 similar to the overload device 86, thereby operating overload contacts 90.

While the control circuit and the motors may be adapted to operate from an alternating current source as is indicated in Figs. 14(a) and 14(b), the magnetic clutches, which function to drivingly connect the motors must be operated from direct current. A rectifier 91, which may be of the selenium type, is coupled across the alternating current control voltage source at points 92 and furnishes direct current for use in the head motor clutch 93 and the chain motor clutch 94.

With the motors 6 and 14 running, the conveyer 1 is started by depressing a start push button 95 and, providing certain limit switches (to be discussed later), are positioned properly, a control relay CR2 and a second control relay CR3 are energized. A pair of contacts CR2(a) are closed and continue to maintain the two relays CR2 and CR3 in an energized condition. Operation of the CR2 relay further closes the contacts CR2(b), thereby energizing a solenoid coil 96(a) which operates the solenoid valve 40, Fig. 4, thereby applying pressure in the cylinder 38 to release the side clamping rail 33. Closure of the contacts CR2(b) further energizes a solenoid 97 which operates the magnetic brake 7 to allow the front sprocket shaft 9 to rotate freely with the brake 7 being released. The energizing of the CR2 relay further closes the contacts CR2(c) which energize the chain motor clutch 94, thereby coupling the power of the chain motor to drive the conveyer 1. The conveyer is thus started, and will continue to move as long as the CR2 relay remains energized.

The CR3 relay, which is energized simultaneously with the CR2 relay upon the depressing of the chain start push button 95, functions only to unlatch a latching relay CR4. The latching relay CR4 is operated during the stapling operation and functions to prevent successive operations of the stapling heads, permitting a single operation only.

A further start button 98 may be provided in the circuit to energize the CR2 and CR3 relays; this button may be located remote from a common control panel 99, which is shown in Fig. 1, and may be at some convenient location such as on the floor beside the machine where it may be depressed by the foot of an attendant.

Once in motion, the conveyer will normally continue until a dog 28 of the pattern chain 11 contacts the microswitch 29. As is shown in Fig. 14(a), the switch 29 is a double-throw switch to simultaneously de-energize the relays CR2 and CR3 and to energize a relay CR1 through a normally closed pair of contacts CR4(a). As the CR2 relay is de-energized, the contacts CR2(b) open, de-energizing the solenoid 96(a) associated with the valve 40 and further de-energizing the solenoid 97 associated with the chain brake 7. Likewise, the CR2(c) contacts are opened, de-energizing the magnetic clutch 94 and its associated peaking capacitor 100. Simultaneously, the CR1 relay is energized, closing a first pair of contacts CR1(a) to retain the CR1 relay in its energized state. Likewise, a second pair of contacts CR1(b) are closed, energizing the solenoid 27 and a solenoid 101, operating the brake 13 and brake 26, respectively. The CR1(b) contacts also energize a solenoid coil 96(b), Fig. 14(a), which is associated with the valve 40, Fig. 4, and functions to reverse the positioning of the valve, and thereby to tighten the side rail 33 upon the frame 31. The energizing of the CR1, Fig. 14(a), relay further closes a pair of contacts CR1(c) which, in turn, energize the magnetic clutch 93 and a peaking capacitor 102.

Thus, the brakes 13 and 26 of the head structure 2, Fig. 8, will be released, and the head motor 14 becomes drivingly coupled to the head structure 2 through the magnetic clutch 57. The conveyer, therefore, stops while the head stapling operating commences. As the head bars 21 descend, the position sensing safety switch 79 opens (as heretofore discussed in connection with Fig. 17), and thereby retains the circuit of relay CR2 open, Fig. 14(a), thus preventing movement of the chain motor 6.

When the stapling operation is completed, the switch 69 operated by the cam 71 in connection with the crank gear 17, opens and thereby de-energizes the relay CR1. At the same time, the second cam operated switch 70 closes and again energizes the relays CR2 and CR3. Thus, with the relay CR1 de-energized and the relay CR2 energized, the circuits controlling the solenoid operated valve 40 for clamping and loosening the side rail 33 and for controlling the magnetic clutches and solenoid operated brakes, are reversed such that the stapling head bar is braked and the conveyer 1 is again driven. The CR3 relay again unlatches the CR4 latching relay to prepare for the next subsequent stapling operation, which may be initiated when another dog 28 contacts the microswitch 29.

A further push button 103 is provided to start the stapling heads through a stapling operation even though the conveyer is not running automatically. Thus, the conveyer may be stopped on a position dictated by an attendant operating the machine, such position being other than the automatic stapling position, and one or more staples may be driven by the manual operation of the push button 103.

Another push button 104 having two pairs of normally closed contacts is provided for an attendant to stop the machine. This push button, when depressed, will stop the operation of the head bar assembly 2 and also stop the conveyer 1, Fig. 1. With this push button depressed, both motors 6 and 14 will continue to run.

An additional push button 105 is provided as an emergency stop. This push button is connected in series with both of the motor relays M1 and M2 and the head control relay CR1 and the conveyer control relay CR2. Therefore, if the emergency push button stop 105 is depressed, both of the motors 6 and 14 will stop and, because the head and conveyer control relays are de-energized, the clutches will be released and the magnetic brakes will be applied to both the head and the conveyer.

As was previously discussed, a push button 98 was provided as an auxiliary start for the machine—this push button being located on the floor as a foot pedal, or in any other convenient location for the operating attendant. A further push button 106 is provided to stop the machine, and this push button likewise may be located conveniently as a floor pedal or otherwise.

The anti-jam safety switch 73 previously discussed in connection with Fig. 1, is a micro limit switch shown in Fig. 14(a). This is a normally closed switch, and when warped material or the like strikes the safety shield 74, Fig. 1, the in-line cam 77 actuates safety switch 73, thus de-energizing CR2 and CR3 relays, causing the machine to stop until the warped material has been cleared from the conveyer.

A selector switch comprising four sets of contacts 107(a), 107(b), 107(c) and 107(d), Fig. 14(a), is arranged in the electrical panel box 99, Fig. 1. This selector switch selects the normal or run operation of the machine; also the jog operation of the machine. Two of these contacts are shown normally open and two are shown normally closed. With the selector switch in the run position, it is not possible to operate jog controls 108(a) and 108(b), 109 and 110, Fig. 14(a), due to the positioning of the contacts heretofore described. With the selector switch in the jog position, contacts 107(a), 107(b), 107(c) and 107(d) are in reverse of their normal position, therefore allowing the jog buttons 108(a), 108(b), 109 and 110 to become effective.

Two sets of multiple contact push buttons are provided as jog controls to move the conveyor or the stapling heads independently, as may be necessary in preliminary adjustment of the machine prior to operating it automatically. One multiple contact push button jog control 108(a) has a pair of normally open contacts which may energize the CR2 relay when the push button is depressed; and a pair of normally closed contacts which may open the hold-in circuit of the CR2 relay, such that the contacts CR2(a) may not function to maintain the relay in its operative position. Therefore, if the jog push button 108(a) is depressed, the conveyor will move and continue to move only so long as the push button 108(a) remains depressed and will immediately stop upon the release of said push button.

A second push button 108(b) is connected into the circuit in an identical manner as the push button 108(a) and, therefore, functions in an identical manner therewith. However, the push button 108(b) may be provided at any remote location for the convenience of a maintenance man, or the like, who may wish to have a jog control at a point remote from the control panel 99 of the machine.

Another push button 109 is provided on the control panel and, likewise, a remote push button 110 may be provided to operate the head control relay CR1 and thereby to jog or move the stapling heads independently of the conveyer for the purpose of setting up the machine prior to the automatic operation thereof. The push buttons 109 and 110, like the push buttons 108(a) and 108(b), have normally closed contacts connected in series with the CR1(a) hold-in contacts of the CR1 relay, such that the head bars 21 will move only while one of the jog push buttons 109 or 110 are depressed, and such movement will not continue after release of the button.

*Arrangement of stapling heads*

Figure 9:
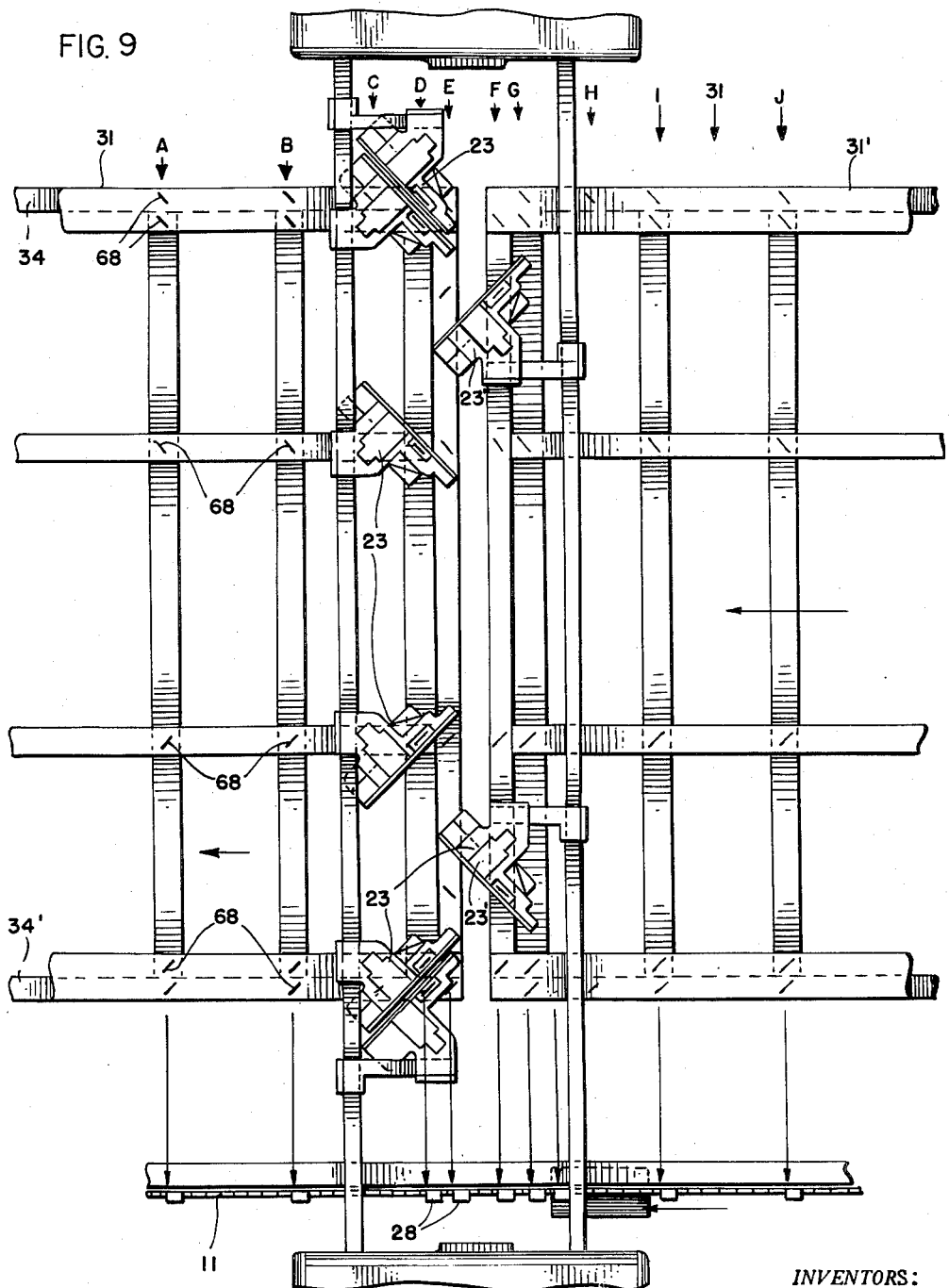
Fig. 9 is a plan view along the plane 9—9 of Fig. 1, showing one arrangement of the stapling heads and frames of one preferred type which may pass thereunder and to be stapled.

As has been previously stated, each stapling operation is initiated when a dog 28 of the pattern chain 11 engages the microswitch 29. The stapling head bar assembly 2 may support one or more stapling heads 23 in various plan arrangements, one of which is shown in Fig. 9. To staple a preferred type of frame 31, the eight stapling heads 23 are arranged such that the staples may be driven along eight rows extending longitudinally with the conveyer. The pattern of staples depends upon the type of frame 31 to be assembled and, generally, such pattern is rectangular such that the staples will appear in transverse rows and longitudinal rows, according to the motion of the conveyer. In any particular stapling operation, a series of staples may be driven along one or two particular transverse rows across the frame, the stapling heads being positioned along such row and the frame being stopped by the conveyer beneath the stapling heads in the desired location.

The pattern chain 11 is shown in Fig. 9 to illustrate its function of controlling the timing of rest intervals and stapling operations of the machine. A dog 28 is positioned with its leading edge opposite each transverse row wherein staples are to be driven. The longitudinal spacing of the stapling pattern is thus determined by the spacing of the dogs 28 along the pattern chain 11. It will be appreciated that the pattern chain 11 and dogs 28 need not be alined as shown with the staple rows in the frame. The pattern chain 11 cooperates with the microswitch 29, as shown in Fig. 5, and thus if both the chain pattern and the microswitch occupy positions offset with the longitudinal position of the stapling heads, such offset will not affect the stapling pattern. The microswitch support member 58 may be mounted to be adjustably moved along a slot 58' extending in a direction longitudinal with the conveyer 1 and the pattern chain 11. By moving the member 58 along the slot 58', the microswitch 29 is shifted with respect to the pattern chain and dogs thereon, and the timing of the stapling operation is shifted with respect to the frame.

The frame 31 to the left, Fig. 9, is passing beneath the stapling heads 23 and staples have been driven along the transverse rows A, B and C, at the position shown in Fig. 9. Six of the heads 23 are in the act of driving staples along the row D, and two such heads 23' are driving staples in the row F. The heads 23' have completed their stapling operation in the row E, but further stapling in that row is yet to be completed by the heads 23 during the next subsequent stapling operation. The next succeeding frame 31' is receiving two staples in the row F and has yet to receive staples in rows F, G, H, I and J, et cetera. Although in the particular stapling operation indicated in Fig. 9 each of the stapling heads must drive a staple at the location shown, there will come subsequent operations where certain staples are to be omitted from the row and, therefore, certain of the stapling heads must be disabled and prevented from driving staples.

*Wire feed control*

Figure 15:
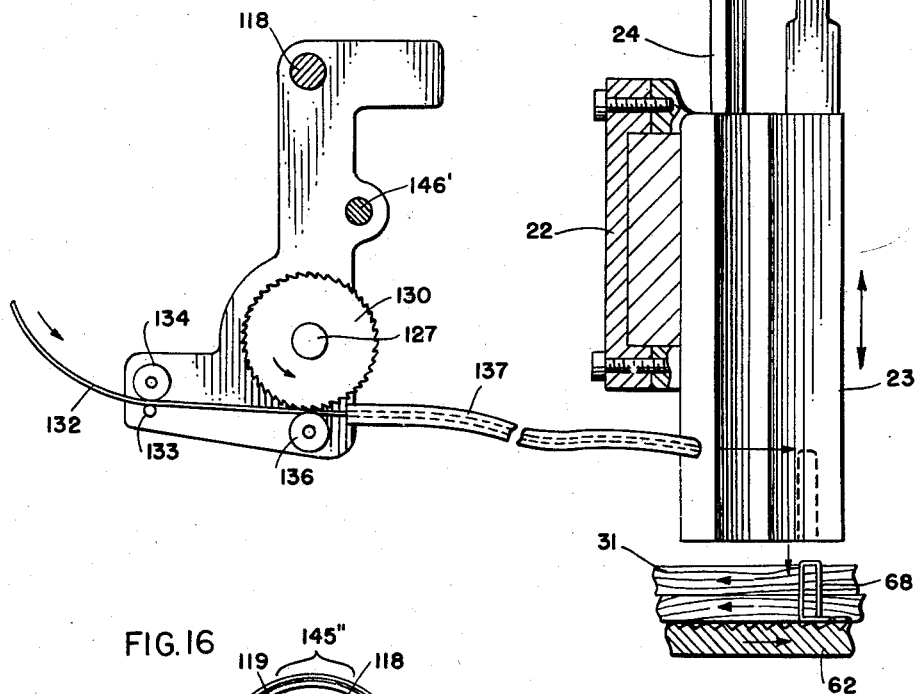
Fig. 15 is an enlarged vertical section looking along the plane 15—15 of Fig. 2 and illustrating the mechanism for feeding wire to a stapling head.

The control of any particular stapling head to cause it to drive or fail to drive a staple during a particular stapling operation, is accomplished by a wire feed arrangement which feeds, or fails to feed, wire to the stapling head. The operation of the wire feed arrangement is illustrated in Figs. 8, 15 and 16. Fig. 8 shows a crank arm 20 having a push-pull link 111 coupled thereto which in turn rocks an arm 112. The rock arm 112 carriers a pawl 113 which engages a ratchet 114. Incremental rotation from the ratchet 114 is translated to a pinion gear 115 with each stapling operation. The pinion gear 115 drives a pair of ratio gears 116 and 117 and thus, the incremental rotative movement is conveyed to a shaft 118. The shaft 118 carries thereupon a plurality of pattern wheels 119, only one of which is shown in Fig. 8. For each stapling head 23 carried by the bar assembly 21, there must be associated therewith a pattern wheel 119 carried and secured to the shaft 118 for determining the wire feed to a stapling head.

A crank 120 is secured to the shaft 15, which furnishes the head drive during the stapling operation, and the crank 120 rocks a rocker shaft 121 by means of a push-pull link 122 and an arm 123, secured to the shaft 121. A rocker arm 124 oscillates from the shaft 121 and, in turn, oscillates a rack member 125. A gear 126 engaged with the rack member 125 is secured to a shaft 127 which rotates with an oscillatory motion. The shaft 127 pivotally supports the ratchet 114 and the gear 115 at one end thereof, but the ratchet and gear are not secured to the shaft but move independently upon a sleeve rotatably mounted about the shaft 127. A pawl 128 is secured to the shaft 127 by a rocker arm 129 fixed to the shaft 127 such that the pawl 128 oscillates as the shaft 127 oscillates during a stapling operation of the machine. A ratchet 130 is freely mounted on the shaft 127 and rotatable independently thereof. The pawl 128 is engageable with the ratchet 130 and therefore may be turned by definite increments for feeding wire to the stapling head.

The length of wire to be fed is adjustable by moving a clamp part 131 of the rack arm 125 upwardly or downwardly along the rocker arm 124. If it is desirable to feed greater length of wire to the stapling heads and thereby produce longer staples, the clamp 131 may be moved upwardly on the rocker arm 124 and the rack will be displaced to a greater arc about the shaft 121, thereby imparting greater increments of motion to the gear 126 and the shaft 127. Conversely, if the clamp part is moved downwardly, less motion will be imparted to the shaft 127, the pawl 128 will sweep through a smaller angle about the ratchet 130, and a lesser amount of wire will be fed to the stapling head 23. As is shown in Fig. 16, a wire 132 for forming the staples passes between a pair of guide rollers 133 and 134. The wire thence passes between a toothed feed wheel 135 associated with the ratchet 130 and an idler roller 136, thence through a tubing 137, which conducts the wire to the stapling head 23. To insure that the wire is held in firm engagement with the feed wheel 135, the idler roller 136 is eccentrically mounted as shown at 138, and an arm 139 is adapted to rotate the idler roller 136 about the pivotal mounting 138 and into frictional engagement with the feed wheel 135. A tension spring 140 urges the arm 139 downwardly and functions to maintain the idler roller 136 against the feed wheel 135.

As has heretofore been described, the pawl 128 is mounted on a rocker arm 129 and oscillates therewith. The pawl 128 is pivotally mounted on the arm 129 at a pivot point 141. The pawl also carries a detent member 142 which is urged outwardly by a compression spring 143 against a pivotal block 144. The pivotal block moves with the detent member into either of two stable positions. The first of the positions shown in Fig. 16 causes the pawl 128 to engage the ratchet 130, while in the second position, the pawl 128 and the detent block 144 moves upwardly and the pawl becomes disengaged from the ratchet 130. It will be appreciated that as the rocker arm 129 moves to the right, Fig. 16, the pawl will be forced upwardly by the teeth of the ratchet 130 and will then assume its disengaged position.

The pattern wheel 119 is adapted to carry a plurality of dogs 145 about its circumference. The pattern may be established about the circumference of the pattern wheel 119 by placing dogs 145, or failing to place dogs, at uniform increments about the circumference of the pattern wheel 119, the pattern wheel 119 being turned from the ratio gears 117, Fig. 8, by a definite increment with each stapling operation. Thus, a dog position of the pattern wheel is presented at the lower extremity thereof with each increment of motion and each stapling operation. A dog 145', Fig. 16, at the lower extremity of the pattern wheel 119 engages and depresses a pawl 146. The pawl 146 has a lower cam surface 147 engageable with the detent pawl 128. If the dog 145', shown on the pattern wheel 119, Fig. 16, depresses the pawl 146, the pawl 128 likewise will be depressed as the rocker arm 129 moves to the left, Fig. 16, and will, therefore, engage and move the ratchet 130, thereby feeding a length of wire to the stapling head. If the pattern wheel 119 carries no dog 145' to the lower extremity thereof, the pawl 146 will not be forced downwardly and therefore the pawl 128 will remain in its upper stable position and move to the left without engaging the ratchet wheel 130, thus resulting in no wire feed to the stapling head and, therefore, no driven staple.

Figure 10:
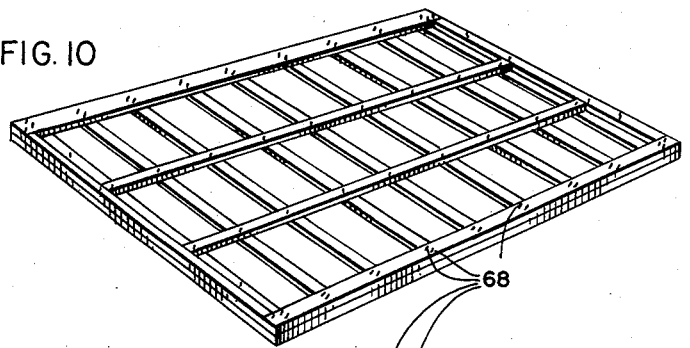
Figs. 10, 11, 12 and 13, are perspective views of various frames and pallets which may be assembled and stapled by the machine of this invention.

The arrangement of dogs about the pattern wheel 119 may be pre-set according to the pattern of the frame to be stapled, and the particular stapling head will drive staples only in those positions required. Fig. 10 is a perspective view of one type of frame which may be stapled together by the machine of this invention. It will be noted that the staples 68 appear in regular geometric pattern—such pattern being adapted to be pre-set on the pattern chain 11 and on the pattern wheel 119. It will be noted that the staples are arranged in eleven transverse rows and in eight longitudinal rows. Thus, the pattern chain must be set to stop the conveyer eleven times as the frame is moved past the stapling heads, and there must be eight stapling heads arranged at the stapling position 2. The pattern chain 11 thereby causes eleven stapling operations in a cycle, and during each operation, the pattern wheels 119 cause selected stapling heads to drive staples.

From a study of the stapling pattern of Fig. 10, it becomes apparent that the stapling heads for driving staples in the two outside longitudinal rows must drive nine staples during nine consecutive stapling operations, and thence must fail to drive staples in two consecutive operations corresponding to the last staple row on one frame and the first row of the next succeeding frame. In Fig. 16, the pattern wheel 119 is illustrated as having positions to accommodate eleven dogs, and there being nine dogs 145 mounted thereon with two adjacent spaces 145'' with dogs missing. Thus, as the pattern wheel 119 is set up, it could feed wire to the stapling heads occupying the two outer rows of the frame of Fig. 10 wherein nine staples would be driven in succession and then two would be skipped. The wire feed apparatus for supplying wire 132 to other staple heads 23 would demand other patterns or dog arrangements to control the stapling operations along the particular longitudinal rows of staples associated with the heads.

*Pattern setups for alternate frame types*

Figure 11:
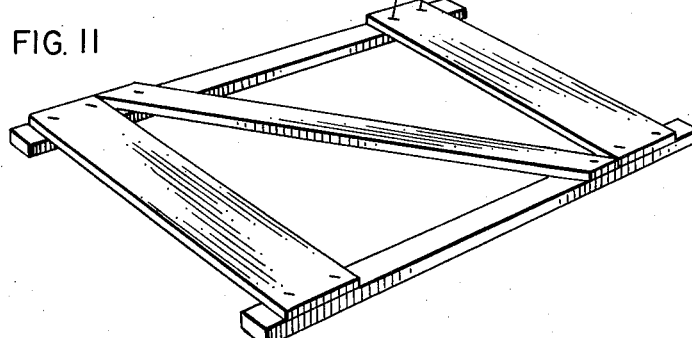
Figure 12:
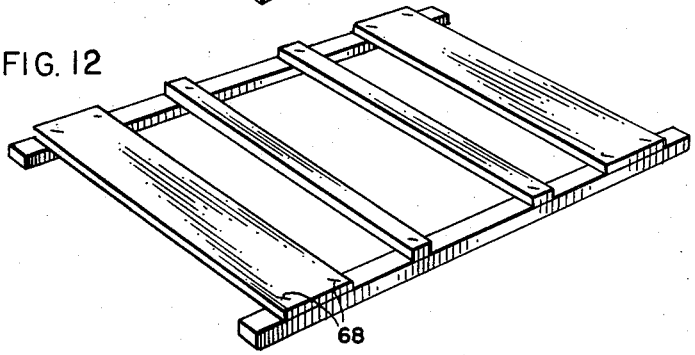
Figure 13:
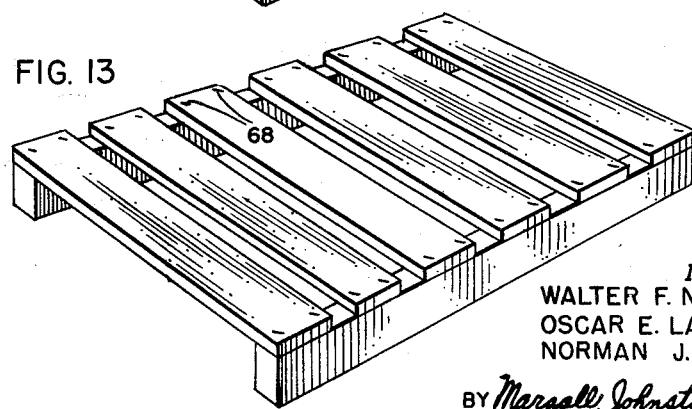

Figs. 11, 12 and 13 illustrate possible alternative types of frames which could be stapled on the stapling machine of this invention. As heretofore mentioned, the conveyer may be narrowed in width to accommodate the smaller pallets or frames illustrated, the attachments on the cross members 5 may be changed to accommodate the longitudinal members or stiles, and the attachments on the chains 3 may be pre-set to accommodate the cross members or rails illustrated in each case. The pattern chain 11 must then be shortened to correspond in length to the length of the new frame, and the dogs 28 must be arranged for the new pattern and number of stapling operations, and the pattern wheels 119 must be arranged to feed or skip staples according to the new pattern. Thus, the frame shown in Fig. 11 would require six stapling operations and, consequently, six dogs 28 on the pattern chain, and each of the two pattern wheels 119 necessary would be arranged with six positions carrying five dogs with one position vacant. Other pattern chain and pattern wheel setups could be arranged to accommodate and staple the frames shown in Fig. 12, Fig. 13, and any other such frame as may be desired.

To change the pattern arrangement for stapling different sorts of frames, it is necessary to replace the ratio gears 116 and 117, shown in Fig. 8, such that the pattern wheel 119 will be moved with greater or lesser angular increments with each stapling operation as may be demanded by the number of transverse staple rows desired in a frame. Thus, if it were desired to assemble frames of the type shown in Fig. 11, the pattern wheel 119 must be set for six operations and the ratio gears 116 and 117 must turn the pattern wheel one-sixth of a revolution or sixty degrees with each stapling operation, thereby completing one revolution of the pattern wheel with each cycle of frame stapling.

The stapling machine herein shown and described provides a rapid method for fastening frames together as they are laid in the conveyer. The staples driven according to a predetermined configuration which is pre-set on the patterning devices, will hold the assembled frames more securely than a similar frame which could be hand-made by a workman. This is true since the frame is tightened and held securely by top and side clamps during the stapling thereof, and since the staples are all uniformly driven and clinched upon the frame or workpiece. Thus, this machine produces frames and pallets which are superior in quality to hand-made frames; and because of the rapidity of its operation, it provides an economy in manufacture of frames since labor costs are lessened.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for stopping a conveyer, said apparatus comprising a pattern chain, drive means coupled to the conveyer and to the pattern chain to drive the pattern chain synchronously with the conveyer, said pattern chain carrying a plurality of stop members spaced therealong in accordance with a pre-set pattern, a switch electrically connected to stop the conveyer, and a member supporting the electrical switch in spaced relation with the pattern chain, said member having a cam surface for engaging the stop members on the pattern chain, said member being movable upon engagement of a stop member on the cam surface thereof and being operable to hold the switch in a precise spaced relation with the stop member.

2. In a machine having a conveyer for carrying a workpiece, apparatus for stopping the frame conveyer with the workpiece in accurate spaced relation with a device for performing an operation thereon, said apparatus comprising a pattern chain coupled to move synchronously with the frame conveyer, a plurality of stop members mounted on the pattern chain and movable therewith, an electrical switch for stopping the conveyer, and a support member holding electrical switch in spaced relation with the pattern chain, said support member having a part engageable with the stop members of the pattern chain and being adapted to move when engaged by a stop member and to support the electrical switch in a precise transverse position with respect to the stop member thereby causing the switch to be operated by the leading edge of the stop member.

3. In a machine having a frame conveyer for carrying a frame to be fastened, apparatus for stopping the frame conveyer with the frame in accurate spaced relation with a stapling head, said apparatus comprising a pattern chain mechanically coupled to the frame conveyer and adapted to move synchronously therewith, a plurality of stop members mounted on the pattern chain, an electrical switch for stopping the conveyer, and a support member holding the electrical switch in spaced relation with the pattern chain, said support member being mounted to pivot the electrical switch transversely toward the pattern chain, said support member having a cam surface, each of said stop member being operable to engage the cam surface and pivot the support member by pressure thereagainst, the support member being pivoted to a position such that the electrical switch will be engaged and operated by the leading edge of the stop member.

4. In a machine having a conveyer for carrying a frame to be stapled, apparatus for stopping the conveyer with the frame in accurate spaced relation with at least one stapling head, said apparatus comprising a pattern chain coupled to move synchronously with the conveyer, a plurality of dogs detachably and adjustably mounted on the pattern chain and movable therewith, an electrical switch for stopping the conveyer, and a pivotal support member holding the electrical switch in spaced relation with the pattern chain, said support member having a cam surface engageable with the stop members on the pattern chain and being adapted to pivot transversely with respect to the pattern chain when engaged by a dog thereon, each of said dogs having a leading edge which may be adjusted longitudinally with the pattern chain, said dogs being operable to engage the cam surface and depress the support member to a position wherein the electrical switch will precisely engage the leading edge of the dog.

5. In a machine having a conveyer for carrying a workpiece and having a plurality of devices spaced transversely across the conveyer for performing operations on the workpiece, apparatus controllably associated with each device for operating the device during selected intervals as the conveyer rests with the workpiece in spaced relation therewith, said apparatus comprising a pattern wheel drive means for indexing the wheel during each interval of conveyer rest, a plurality of stop members spaced about the pattern wheel in accordance with a sequence of operation and non-operation of the device, means operatively associated with the pattern wheel and with the device for controllably operating the device when a stop member of the pattern wheel contacts said means.

6. In a machine having a conveyer for carrying a workpiece and having a plurality of devices spaced transversely across the conveyer for performing operations on the workpiece, apparatus controllingly associated with each device for operating the device during selected intervals when the conveyer rests with the workpiece in spaced relation with the device, said apparatus comprising a pattern wheel, drive means for indexing the wheel during each interval of conveyer rest, a plurality of dogs spaced about the pattern wheel in accordance with a sequence of operations and non-operations of the device, a ratchet operatively associated with the device whereby rotation of the ratchet causes the device to operate in conjunction with the workpiece, a pawl engageable with the ratchet, an oscillatory member supporting the pawl, further drive means coupled to oscillate the oscillatory member during each rest interval of the conveyer, and means for depressing the pawl into engagement with the ratchet, said pawl depressing means being positioned between the pattern wheel and the pawl and being operative to engage the pawl with the ratchet and to thereby cause operation of the device when the pattern wheel rotates and a dog contacts the pawl depressing means for selectively feeding wire into the stapling head.

7. In a stapling machine having a conveyer for carrying a frame and having a plurality of stapling heads spaced transversely across the conveyer for driving staples into the frame, apparatus controllably associated with each stapling head for causing the staples to be formed and driven into the frame and clinched thereon during selected intervals when the conveyer rests with the frame in spaced relation with the stapling head, said apparatus comprising a pattern wheel drive means for indexing the pattern wheel during each interval of conveyer rest, a plurality of dogs spaced about the pattern wheel in a pre-set sequence corresponding to a sequence of operation and non-operation of the stapling head, a rotatably mounted ratchet, a wire feed wheel associated with the ratchet and rotatable therewith, said ratchet and wire feed wheel being operative to pass wire to the stapling head during the selected intervals when a staple is to be driven, an oscillatory member mounted to rock about the axis of the ratchet, a pawl carried by the oscillatory member and engageable with the ratchet, and a shiftable member interposed between the pattern wheel and the pawl, said shiftable member being responsive to the positioning of the dogs on the pattern wheel and being operative to depress the pawl into an engaged position with the ratchet, whereby the pawl rotates the ratchet and feeds wire to the stapling head when a dog contacts the shiftable member.

8. Apparatus for controlling the operation of a conveyer which comprises a pattern chain, drive means coupled to the conveyer and to the pattern chain to drive the pattern chain synchronously with the conveyer, said pattern chain carrying a plurality of stop members spaced therealong in accordance with a pre-set pattern, and a switch electrically connected to said drive means for controlling stopping of said conveyer, said switch being positioned in the path of said dogs on said pattern chain, whereby actuation of said switch by a dog effects stopping of said conveyer.

9. A machine for assembling wooden components of a frame and securing said components together with fasteners which comprises, a plurality of fastening devices, an endless conveyer adapted to carry the wooden components in pre-arranged relation past said fastening devices, means for stopping said conveyer during operation of said fastening devices, said means including a pattern chain, drive means coupled to the conveyer and to the pattern chain to drive the pattern chain synchronously with the conveyer, said pattern chain carrying a plurality of stop members spaced therealong in accordance with a pre-set pattern, and a switch electrically connected to said drive means for controlling stopping of said conveyer, said switch being positioned in the path of said dogs on said pattern chain, whereby actuation of said switch by a dog effects stopping of said conveyer, and means for controlling the operation of said fastening devices during selected intervals as the conveyer rests, said control means including a pattern wheel, a plurality of stop members spaced about the pattern wheel in accordance with a sequence of operation and non-operation of each device, and means operatively associated with the pattern wheel and with each device for controllably operating each device when a stop member of the pattern wheel contacts said means.

10. A machine for assembling wooden components of a frame and securing said components together with staples which comprises, a plurality of spaced apart staplers extending along a plane transversely of said machine, an endless conveyer extending longitudinally of said machine and adapted to carry wooden components in pre-arranged relation past said staplers, means for substantially simultaneously stopping the conveyer and effecting actuation of said staplers, means for restarting the conveyer at the conclusion of the stapling operation, and means for controlling the feeding of wire to said staplers.

11. A machine for assembling wooden components of a frame and securing said components together with staples which comprises, a plurality of spaced apart staplers extending along a plane transversely of said machine, an endless conveyer extending longitudinally of said machine and adapted to carry wooden components in pre-arranged relation past said staplers, means for substantially simultaneously stopping the conveyer and effecting actuation of said staplers, said means comprising a pattern chain having a plurality of dogs spaced therealong in accordance with a pre-set pattern, first drive means coupled to said conveyer and to said pattern chain to drive the pattern chain synchronously with the conveyer, and a first switch electrically connected to said first drive means for controlling the actuation of said first drive means and the stopping of said conveyer, said first switch being positioned in the path of said dogs on said pattern chain to be actuated thereby, a wire feeding device for feeding wire to each stapler, second drive means coupled to each stapler and each wire feeding means to drive the wire feeding means synchronously with said staplers, said first switch electrically connected to said second drive means for starting same upon actuation thereof, a second switch actuatable by said second drive means and electrically connected thereto to effect stopping thereof at the conclusion of one cycle of operation of said staplers.

12. A machine for assembling wooden components of a frame and securing said components together with staples which comprises, a plurality of spaced apart staplers extending along a plane transversely of said machine, an endless conveyer extending longitudinally of said machine and adapted to carry wooden components in pre-arranged relation past said staplers, means for substantially simultaneously stopping the conveyer and effecting actuation of said staplers, said means comprising a pattern chain having a plurality of dogs spaced therealong in accordance with a pre-set pattern, first drive means coupled to said conveyer and to said pattern chain to drive the pattern chain synchronously with the conveyer, and a first switch electrically connected to said first drive means for controlling the actuation of said first drive means and the stopping of said conveyer, said first switch being positioned in the path of said dogs on said pattern chain to be actuated thereby, a wire feeding device for feeding wire to each stapler, second drive means coupled to each stapler and each wire feeding means to drive the wire feeding means synchronously with said staplers, said first switch electrically connected to said second drive means for starting same upon actuation thereof, a second switch actuatable by said second drive means and electrically connected thereto to effect stopping thereof at the conclusion of one cycle of operation of said staplers, and a third switch actuatable by said second drive means and electrically connected to said first drive means to restart same at the conclusion of one cycle of operation of said staplers, and control means for selectively controlling said wire feeding device.

13. A machine for assembling wooden components of a frame and securing said components together with staples which comprises, a plurality of spaced apart staplers extending along a plane transversely of said machine, an endless conveyer extending longitudinally of said machine and adapted to carry wooden components in pre-arranged relation past said staplers, means for substantially simultaneously stopping the conveyer and effecting actuation of said staplers, said means comprising a pattern chain having a plurality of dogs spaced therealong in accordance with a pre-set pattern, first drive means coupled to said conveyer and to said pattern chain to drive the pattern chain synchronously with the conveyer, and a first switch electrically connected to said first drive means for controlling the actuation of said first drive means and the stopping of said conveyer, said first switch being positioned in the path of said dogs on said pattern chain to be actuated thereby, a wire feeding device for feeding wire to each stapler, second drive means coupled to each stapler and each wire feeding means to drive the wire feeding means synchronously with said staplers, said first switch electrically connected to second drive means for starting same upon actuation thereof, a second switch actuatable by said second drive means and electrically connected thereto to effect stopping thereof at the conclusion of one cycle of operation of said staplers, a third switch actuatable by said second drive means and electrically connected to said first drive means to restart same at the conclusion of one cycle of operation of said staplers, and control means for selectively controlling said wire feeding device, said control means including a pattern wheel having a plurality of dogs spaced circumferentially thereof in accordance with a sequence of operations and non-operations of said wire feeding device, and mechanical means actuated by said dogs to effect incremental feeding of wire to a stapler.

References Cited in the file of this patent

UNITED STATES PATENTS

| | | |
|---|---|---|
| 625,958 | Rosback | May 30, 1899 |
| 1,943,840 | Row | Jan. 16, 1934 |
| 2,211,285 | Miller | Aug. 13, 1940 |
| 2,482,370 | Rosenmund | Sept. 20, 1949 |